United States Patent
Schulz (10) Patent No.: US 10,609,567 B2
(45) Date of Patent: Mar. 31, 2020

(54) FORMING A WIRELESS COMMUNICATION NETWORK FOR A PROCESS CONTROL SYSTEM DETERMINING RELAY DEVICES ACCORDING TO TRANSMISSION DELAY AND COVERAGE CONSTRAINTS

(71) Applicant: ABB Schweiz AG, Baden (CH)

(72) Inventor: Dirk Schulz, Meckenheim (DE)

(73) Assignee: ABB Schweiz AG, Baden (CH)

(*) Notice: Subject to any disclaimer, the term of this patent is extended or adjusted under 35 U.S.C. 154(b) by 188 days.

(21) Appl. No.: 15/999,738

(22) PCT Filed: Feb. 18, 2016

(86) PCT No.: PCT/EP2016/053410
§ 371 (c)(1),
(2) Date: Aug. 20, 2018

(87) PCT Pub. No.: WO2017/140359
PCT Pub. Date: Aug. 24, 2017

(65) Prior Publication Data
US 2019/0342764 A1 Nov. 7, 2019

(51) Int. Cl.
*H04L 12/28* (2006.01)
*H04W 16/20* (2009.01)
(Continued)

(52) U.S. Cl.
CPC .......... *H04W 16/20* (2013.01); *H04W 16/26* (2013.01); *H04W 84/047* (2013.01); *H04W 84/18* (2013.01)

(58) Field of Classification Search
CPC .... H04W 16/20; H04W 84/18; H04W 84/047
(Continued)

(56) References Cited

U.S. PATENT DOCUMENTS

2004/0143428 A1 7/2004 Rappaport et al.
2005/0046584 A1* 3/2005 Breed .................... B60C 11/24
340/13.31
(Continued)

FOREIGN PATENT DOCUMENTS

KR 20130116529 A 10/2013
WO 2016014328 A1 1/2016

OTHER PUBLICATIONS

International Preliminary Report on Patentability Application No. PCT/EP2016/053410 dated May 16, 2018 7 pages.
(Continued)

*Primary Examiner* — John Pezzlo
(74) *Attorney, Agent, or Firm* — Whitmyer IP Group LLC (57) ABSTRACT

A method for determining a wireless communication network realization in a plant where a process control system is provided includes receiving a user selection of wireless end point devices and locations of these in the plant, each being provided as at least one of a pair of endpoint devices that are to communicate with each other in relation to an automation function of the process control system, obtaining data communication requirements of the wireless endpoint devices, which are related to the automation functions and include at least one signal sent between a pair of endpoint devices and a time within which it has to reach its destination, and determining a number of wireless relay devices related to the locations of wireless endpoint devices in the plant for achieving a defined degree of radio coverage sufficient to satisfy the data communication requirements.

19 Claims, 4 Drawing Sheets

(51) Int. Cl.
*H04W 16/26* (2009.01)
*H04J 1/16* (2006.01)
*H04W 84/04* (2009.01)
*H04W 84/18* (2009.01)

(58) Field of Classification Search
USPC .................................. 370/252, 329, 386, 254
See application file for complete search history.

(56) References Cited

U.S. PATENT DOCUMENTS

| | | |
|---|---|---|
| 2009/0059814 A1 | 3/2009 | Nixon et al. |
| 2013/0183961 A1 | 7/2013 | Bassiri et al. |
| 2013/0201316 A1* | 8/2013 | Binder .................... H04L 67/12 348/77 |
| 2013/0285855 A1* | 10/2013 | Dupray .................... G01S 19/48 342/451 |
| 2013/0286888 A1 | 10/2013 | Gallegos et al. |
| 2014/0226524 A1 | 8/2014 | Kalika et al. |
| 2014/0234949 A1* | 8/2014 | Wasson .............. G01N 35/1065 435/287.2 |
| 2015/0046140 A1 | 2/2015 | Kamalakannan |

OTHER PUBLICATIONS

International Search Report and Written Opinion of the International Searching Authority Application No. PCT/EP2016/053410 Completed: Oct. 11, 2016; dated Oct. 20, 2016 18 pages.

Nortel WLAN: "Management Software 2300 Series Reference Guide", Jun. 30, 2008, Santa Clara, CA https://downloads.avaya.com/css/P8/documents/100096574 pp. 137, 140, and 141.

Ali Mahani et al: "Two tiers wireless mesh networks: Optimal configuration", Computer and Knowledge Engineering (ICCKE), 2011 1st International Econference on, IEEE, Oct. 13, 2011 (Oct. 13, 2011): pp. 303-307.

Written Opinion of the International Searching Authority Application No. PCT/EP2016/053410 dated Jan. 15, 2018 7 pages.

* cited by examiner

| System Applications | Communication connection resources | | Communication device resources | |
|---|---|---|---|---|
| S1 | S2 | | | |
| Name | Name | Type | Name | Name |
| Network Management | Actuator control | Cyclic | Data Input/Output | Controller |
| Process Area Closed-Loop Control | Sensor reporting | Cyclic | Data Input/Output | WController |
| Field device management | Video trunk | Cyclic | Data Input/Output | WSensor |
| Mobile workforce | Field device management (South) | Cyclic | Data Input/Output | WActuator |
| Video surveillance | Field device management (North) | Cyclic | | |
| | Network managment | Cyclic | | |

Applications FI     Signals SI    Device Functions DF    Device ED

FORMING A WIRELESS COMMUNICATION NETWORK FOR A PROCESS CONTROL SYSTEM DETERMINING RELAY DEVICES ACCORDING TO TRANSMISSION DELAY AND COVERAGE CONSTRAINTS

TECHNICAL FIELD

The present invention generally relates to process control systems. More particularly the present invention relates to a network configuration device as well as a method and a computer program product for determining a wireless network realization in a plant where a process control system is provided.

BACKGROUND

A process control system may be provided in an industrial plant. Such a system normally comprises a number of process control devices involved in the control of the process, such as field devices and process control computers. The operation of these devices is typically monitored by plant operators via operator terminals of the system. Such a process control system may also comprise a wireless communication network, such as a wireless sensor and actuator network.

It may then be of interest to provide a network forming unit, for instance in the form of a network simulation tool for supporting the design of a communication infrastructure to be used for the process control system and the process control applications or functions using it and then especially for the design of a wireless communication network of such a communication infrastructure.

There exist tools for planning of wireless networks, see for instance US 2014/0226524. However, these tools are provided for the implementation of wireless user networks in which users communicate using handsets. However, a process control system typically has specific requirements both on the traffic and on the devices and these requirements are in many ways different from the requirements of a wireless user network. Therefore these kinds of tools are often not suitable for use in relation to process control systems and the wireless communication networks that these employ.

It would therefore be of interest to improve on the above-mentioned situation.

SUMMARY

The present invention addresses the problem of providing a wireless network realization for a process control system.

According to a first aspect of the invention this object is more particularly achieved with a network configuration device for determining a wireless communication network realization in a plant where a process control system is provided, the device comprising:

a network forming unit operative to:

receive a user selection of wireless end point devices and locations of these wireless endpoint devices in the plant, where each wireless endpoint device is provided as at least one of a pair of endpoint devices that are to communicate with each other in relation to an automation function of the process control system, where one endpoint device in a pair performs processing and the other provides data for or receives results of said processing, obtain data communication requirements of the wireless endpoint devices, which data communication requirements are related to the automation functions and comprise at least one signal sent between a pair of endpoint devices and the time within which it has to reach its destination in order to be able to be used in the corresponding automation function, and determine a number of wireless relay devices related to the locations of the wireless endpoint devices in the plant for achieving a defined degree of radio coverage sufficient to satisfy the data communication requirements.

This object is according to a second aspect of the invention achieved through a method for determining a wireless communication network realization in a plant where a process control system is provided, the method being performed by a network configuration device and comprising:

receiving a user selection of wireless end point devices and locations of these wireless endpoint devices in the plant, where each wireless endpoint device is provided as at least one of a pair of endpoint devices that are to communicate with each other in relation to an automation function of the process control system, where one endpoint device in a pair performs processing and the other provides data for or receives results of said processing, obtaining data communication requirements of the wireless endpoint devices, which data communication requirements are related to the automation functions and comprise at least one signal sent between a pair of endpoint devices and a time within which it has to reach its destination in order to be able to be used in the corresponding automation function, and determining a number of wireless relay devices related to the locations of the wireless endpoint devices in the plant for achieving a defined degree of radio coverage sufficient to satisfy the data communication requirements.

This object is according to a third aspect of the invention achieved through a computer program product for determining a wireless communication network realization in a plant where a process control system is provided, the computer program product being provided on a data carrier comprising computer program code operative to cause a network configuration device, when the computer program code is loaded into the network configuration device, to:

receive a user selection of wireless end point devices and locations of these wireless endpoint devices in the plant, where each wireless endpoint device is provided as at least one of a pair of endpoint devices that are to communicate with each other in relation to an automation function of the process control system, where one endpoint device in a pair performs processing and the other provides data for or receives results of said processing, obtain data communication requirements of the wireless endpoint devices, which data communication requirements are related to the automation functions and comprise at least one signal sent between a pair of endpoint devices and the time within which it has to reach its destination in order to be able to be used in the corresponding automation function, and determine a number of wireless relay devices related to the locations of the wireless endpoint devices in the plant for achieving a defined degree of radio coverage sufficient to satisfy the data communication requirements.

The present invention has a number of advantages. It allows a fast and simple determination of the wireless communication network for a real process control system. This can also be done without requiring any extensive expert knowledge of the user. It also ensures that automation functions can be carried out in the proposed structure.

BRIEF DESCRIPTION OF THE DRAWINGS

The present invention will in the following be described with reference being made to the accompanying drawings, where FIG. 1 schematically shows a real process control system comprising process control devices, FIG. 2 schematically shows one way of realizing a network configuration device for use in relation to process control systems, FIG. 3 schematically shows another way of realizing the network configuration device.

DETAILED DESCRIPTION

In the following there will be given a detailed description of preferred embodiments of a network configuration device as well as a method and a computer program product for determining a wireless network realization for a process control system.

Figure 1:
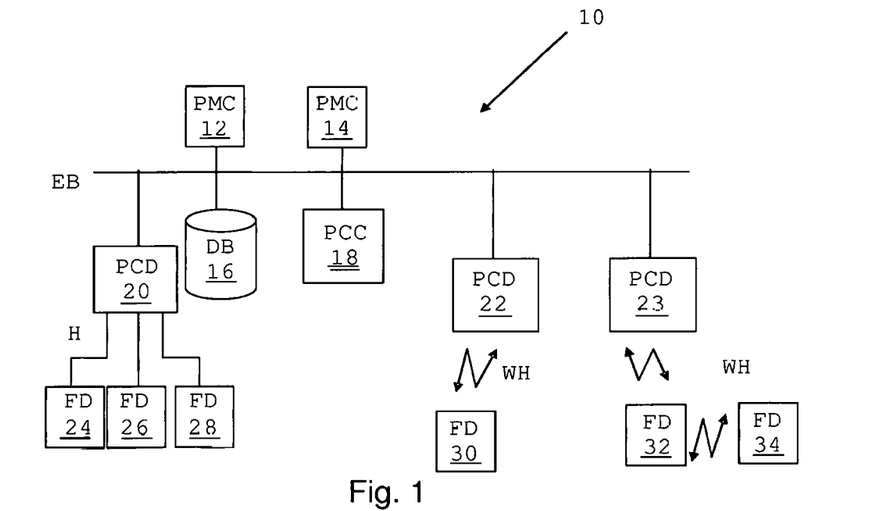

FIG. 1 schematically shows a real or real-world process control system 10, which may be provided in the premises of an industrial plant. The process control system 10 is a computerized process control system for controlling an industrial process. Examples of industrial processes that may be controlled are electrical power generation, transmission and distribution processes, water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers or controllers, which communicate with a computer or server handling monitoring and control of the process.

In FIG. 1 the process control system 10 therefore includes a number of process monitoring computers (PMC) 12 and 14. These computers may here also be considered to form operator terminals and are connected to a first data bus EB, which in this example is an Ethernet databus on which a certain protocol is used, which protocol may as an example be the Profinet IO protocol. A process monitoring computer may furthermore be acting as a network configuration device. There is also a process control computer (PCC) 18 and a database (DB) 16 connected to the first data bus EB. To this first data bus EB there is also connected a first, second, and third remote Input Output device or remote IO device 20, 22 and 23. A remote IO device may have point-to-point connections with a number of field devices. On at least one of these point-to-point connections another communication protocol may be used, which as an example may be the HART protocol. A remote IO device may also have a wireless connection with a number of field devices on which a wireless protocol may be used, such as a Wireless HART protocol WH.

To the first remote IO device 20 there is connected a first group of further devices 24, 26 and 28 and to the second and third remote IO devices 22 and 23 there is connected a second group of further devices 30, 32 and 34. These further devices 24, 26, 28, 30, 32 and 34 are field devices, which are devices that are interfaces to a process being controlled. A field device is therefore an interface, such as a sensor, via which measurements of the process are being made or an interface, such as an actuator, to which control commands are given for influencing the process. A field device may also be a combined sensor and actuator. A field device may as an example be a tank and another as an example a centrifuge.

The process control computer 18 may be involved in controlling the process based on inputs from field devices, such as from sensors, and actuating the same or other field devices, such as valves, based on the inputs. In such an actuation there may a control period T, within which the control may have to be performed in order to have an effect on the process control. The control period T is then typically made up of the time from which a process property is sensed until the control activity that is based on the sensed property is carried out.

The field devices and control computer are all examples of process control devices. Furthermore, the field devices and control computer are both examples of endpoint devices in a communication infrastructure or communication network employed by the process control system, while the remote IO devices, buses and point-to-point-connections are examples of communication infrastructure elements or communication network elements in the form of communication network nodes and communication media. The communication network may also comprise cables with the buses or communications lines as well as routers and switches.

It should be noted that in addition to process control and automation functions concerned with monitoring and control of the industrial process, there are other functions in the plant that may also use the communication infrastructure. For example other technical functions such as: video surveillance and/or Closed-circuit television (CCTV); communication with a mobile workforce; speech; public announcement systems; alarming and safety systems; building control functions.

As can be seen in FIG. 1, the first group of further devices 24, 26 and 28 are wired devices connected to the first remote IO device 20 via-fixed point-to-point connections, while the second group of further devices 30, 32 and 34 are wirelessly connected to the second and third remote IO devices 22 and 23 and thereby the second and third remote IO device are wireless remote IO devices. Of the further devices in the second group, there is then a first wireless field device 30 wirelessly connected to the second wireless IO device 22. There is also a second wireless field device 32 wirelessly connected to the third remote IO device 23 and a third wireless field device 34 wirelessly connected to the third remote IO device 23 via the second wireless field device 32. Thereby the third wireless field device 34 communicates with the third remote IO device 23 using a hop via the second wireless field device 32.

Furthermore, the communication between the wireless communication network and the rest of the process control system may be made via a backbone network, of which the first data bus EB may be a part.

As described above, one process monitoring computer may be acting as a network configuration device. However, it should be realized that such a device does not have to be provided in a process monitoring computer or even be a part of the process control system. It may be a separate entity, such as a wireless terminal.

Figure 2:
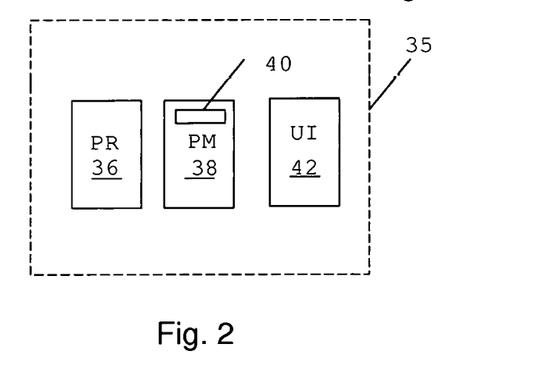

The network configuration device may as an alternative be considered to be a network simulation tool because it is with advantage provided as a software tool that can be used to perform simulations in a system model of a communication network of the process control system. One way of realizing the network configuration device 35 is schematically shown in FIG. 2. The network configuration device 35 may be realized as a computer comprising a processor (PR) 36 with program memory (PM) 38 comprising a computer program 40 with computer program code implementing the functionality of the network configuration device 35. As an alternative it is possible that the functionality is implemented using dedicated circuits such as Field-Programmable Gate Arrays (FPGAs) or Application Specific Integrated Circuits (ASICs). The network configuration device 35 may also comprise a user interface (UI) 42 for instance in the form of a display and mouse/keyboard combination.

Figure 3:
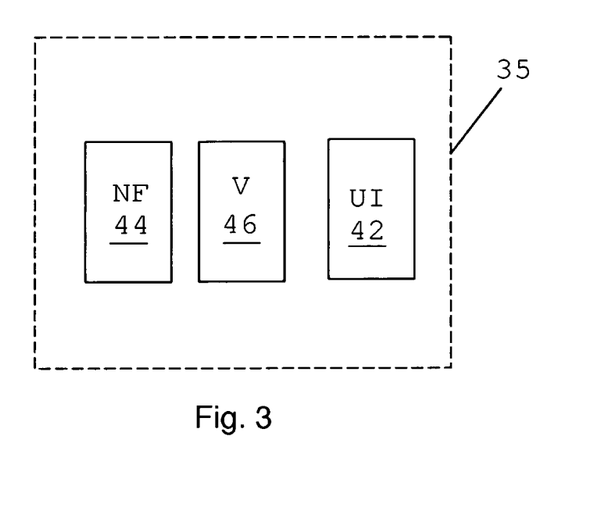

Another way of realizing the network configuration device 35 is shown in FIG. 3. The network configuration device 35 may comprise a network forming unit (NF) 44 and a visualizing unit (V) 46 in addition to the user interface (UI) 42. It is also here possible that the network forming and visualizing units 44 and 46 are provided in the form of software or one or more dedicated circuits such as FPGAs and ASICs.

When designing a process control system a user may use the network forming unit 44 of the network configuration device 35 for automated calculation or modelling of a communication network that is to be used by the process control system. The network forming unit 44 may thus create a system model of the communication network for use in relation to the process control system. The system model may with advantage be an offline model, i.e. a model that is distinctly separate from the operated process control system. The system model may thus be separate from the actual communication network being implemented. The model may then comprise software objects representing actual or real life devices. The model may in this case more particularly also comprise the configurations of such actual or real life devices.

Graphical objects representing functional nodes, infrastructure nodes (router, access points, etc.) or servers, etc. can be selected and placed in a network, representing design choices that an automated calculation must consider as additional requirements. The objects may be duplicated, replaced or moved around at will. Links, rings, backbones etc. can be re-sized and/or have other structures added (connected) using graphical manipulation of the objects similar to a computer drawing application.

More specifically the network forming unit 44 allows the user to select constraints on the planning for instance by choosing graphic objects representing implementation options for data paths between the functional end devices and over dedicated network elements and configure them in the system model of the communication infrastructure.

Furthermore, the network forming unit 44 may also perform a calculation of the communication requirements of signals used by the process control functions. The communication requirements or communication parameters may involve amounts and frequency, latency, availability, segregation needs, etc. of data communication traffic between the functional nodes required by one or more automation or process control functions. The communication requirements may more particularly comprise quality of service requirements, such as allowed round-trip time, bandwidth, jitter and availability. The communication requirements may more particularly comprise signals and timing requirements on such signals, where the timing requirements may depend on the above-mentioned control period T. As bandwidth is one possible communication requirement, the communication requirements related to a signal may comprise the amount of data to be transmitted in the signal. Furthermore, a functional node is a node in the process control system and for this reason it is also an endpoint device for communication with another end point device in the communication network being designed.

Data communication requirements may for instance be calculated from customer requirements (preferably auto or semi-automatically from a sales support tool) or process engineering outputs imported as scanned images and/or annotated images, resource documentation (e.g. in XML, Automation ML, or table-based information in CSV, Excel, etc.) of other project requirements (number of tags, translation of a PID schema etc.), and one or more selected automation application(s). Communication requirements for a process control function and a pair of communication endpoints include the endpoints to connect, and quality of service (QoS) key performance indicators (KPIs) for the communication parameter, such as a signal of the process control function. A KPI may be bandwidth, cycle/round-trip time or simple delays, allowed jitter, availability, etc. Also type of service, i.e. in what way signals are to be sent, like cyclic/periodic, event-based/on-demand, streaming, etc. may be a part of the communication requirements.

The network forming unit 44 thus allows the user to select end point devices and process control functions and based on the user selections, the network forming unit 44 then suggests communication network elements to be placed between the end point devices. The suggestions may not only comprise suggestions about communication network elements such as routers, switches and cables. It may also comprise logical connection suggestions according to a layered communication model, for instance according to the Open Systems Interconnection (OSI) model by the International Organization for Standardization (ISO). The used layered model may also be an enhanced model that is based on for instance the OSI model. It is as an example possible that at least one further layer (an eighth layer) has been added to the model. The network forming unit 44 may for instance make logical connection suggestions from layer 2 up to layer 7 of the OSI model and above. The suggestion may be based on pre-defined rules that are based on best practices, technology and resources, where the best practices may consider premises layout, technology may consider addressing used and resources may consider the types and availability of existing equipment. In the used layered model, such as the OSI model, it is also possible that some layers are not used. Others may be split in two. However, the lowest and highest layer, which in the OSI model would be the physical layer and the application layer, may always be required.

Figure 4:
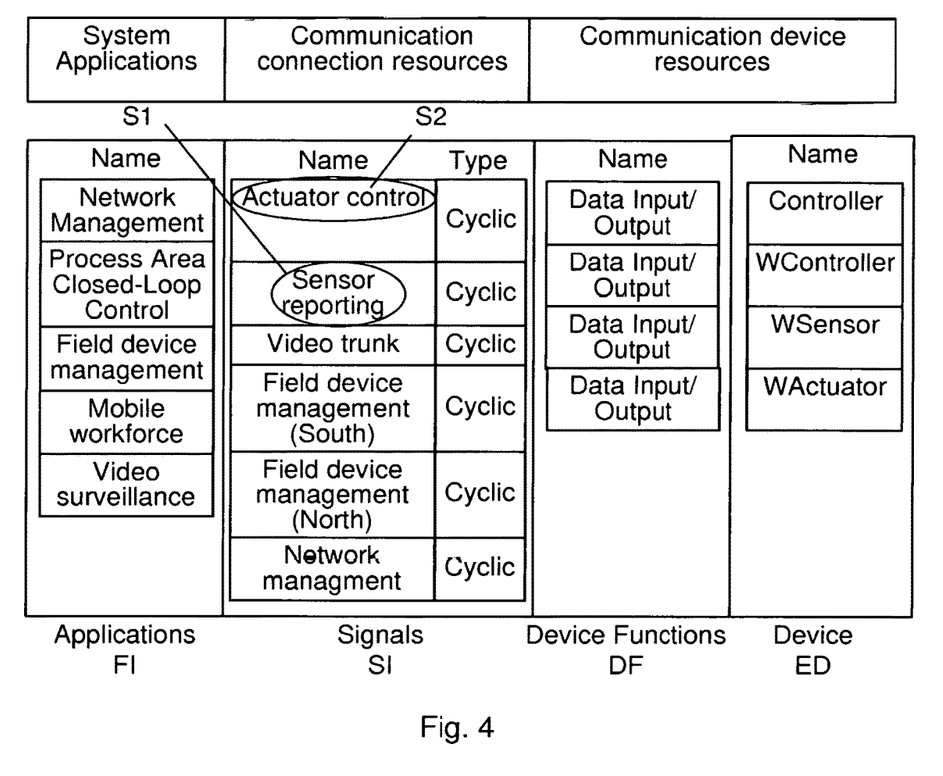
FIG. 4 shows a graphical representation of a number of process control entities that may be selected by a user in the forming of a system model of a communication network for the process control system.

FIG. 4 shows an example of a graphical representation of such a system model where a few items are shown in the form of applications or automation functions FI, signals SI, device functions DF and end point devices ED.

As an example the user may select endpoint devices in an exemplifying endpoint device column. Examples of selectable endpoint devices are shown in the end device column in FIG. 4. It may here be noted that the various endpoint devices that may be selected comprises a controller, a wireless controller Wcontroller, a wireless actuator WActuator and a wireless sensor WSensor. Also other endpoint devices may exist. However, these are normally wired field devices and have been omitted for reasons that will be evident later on.

A selection of an item by the user, such as a selection of endpoint device, will thereby lead to a corresponding software object being made a part of the system model. Each software object when being made a part of the system model is then automatically associated with requirements necessary for connecting to other software objects in the model representing other endpoint devices or communication network elements. The software objects are examples of software representations of the endpoint devices and communication infrastructure elements. It should be realized that other types of software representations are possible. The communication parameters for an end point device may be provided as a part of the software object representing the endpoint device or as one or more separate software objects having a relationship or being linked to the software object representing the endpoint device. The communication parameters for an end point device connected to a data link or backbone may as an example include signal information, configuration of e.g. Internet Protocol (IP) address, connections to/between, data performance e.g. or other Key Performance Indexes (KPIs).

The user may thus select endpoint devices that are to implement process control functions and communication parameters, such as the signals to be exchanged between the endpoint devices. The user may also select endpoint device functions or endpoint device applications performing the endpoint device functions, such as control or data input/output and possibly also communication protocols to be used. An application is thus an application realising an automation function implemented on an endpoint device. An application may be a software-based service that is engineered or delivered individually. Each application may have to work according to a specification. An application may as an example be an International Electrotechnical Commission (IEC) 61131 application for closed loop control, a Device management application, a Plant asset management application, a Network management application, a Security monitoring application, a Process operation application or a Manufacturing Execution System (MES) application. The network forming unit 44 may therefore also add a software object representing an application implemented by an endpoint device to be a part of the system model. Such an application may then be added as code in the software object representing the endpoint device or as a separate software object referencing the software object referencing or linked to the end point device.

Based on process knowledge, the user may thus select a process control computer, a field device that is to communicate with the process control computer, a process control function to be implemented by an application of the selected endpoint devices as well as the signals exchanged by the end point devices and communication protocols used. The network forming unit 44 of the network configuration device 35 may then insert software objects representing these entities into the system model and add the communication requirements of the application or automation function, such as the signals and the bandwidth, latency and type of service requirements of these signals. The communication requirements may be added to the above-mentioned inserted software objects or as separate software objects referencing them. The network forming unit 44 may also make further communication settings, such as communication settings according to the OSI layer model. Examples of such settings are data link layer settings and network layer settings. As an alternative it is possible that the selection of an item and the inserting of the corresponding software object as a part of the system model may also lead to an automatic selection of another item and the provision of corresponding software in the system model. It is for instance possible that an end point device is associated with a communication protocol so that the selection of a particular end point device automatically results in the selection of a corresponding communication protocol. The selection of a certain end point device may also be a selection of a corresponding process control function. It is also possible that the selection of a certain process control function at the same time leads to certain signals being selected. This means that a selection of a particular end point device may lead to the network configuration device 35 selecting a communication protocol and/or a corresponding endpoint device function and/or corresponding signals.

The user may optionally also select some of the communication requirements, such as a set of communication parameters of the communication between the end point devices, like a set of signals of the process control function to be sent between the endpoint devices. In this case the limitations of these communication parameters may be known by the network forming unit 44.

For every pair of selected endpoint devices, the network forming unit 44 therefore also obtains information about requirements of the process control function on the communication between the end point devices. The communication requirements may comprise quality of service (QoS) requirements such as round-trip time, bandwidth, jitter and availability. The requirements may especially comprise the above-mentioned requirements depending on the process control period T. However, the requirements may also comprise other types of requirements such as the requirement of redundancy or a requirement of functional autonomy.

Functional autonomy of an automation function is not a property of the function, but rather the relationship or lack of it between two or more functions. A function is considered to be autonomous if it is unaffected by changes made in relation to any other function. The degree of autonomy of a certain function thus depends on the degree with which changes or failures in another function affect it. One way to achieve functional autonomy (mutual independence) of applications is to use dedicated (mutually independent) resources for each application. Another way is the virtualization of shared resources.

The network forming unit 44 may thus receive a user selection of at least one pair of end-point devices that are to communicate with each other in the process control system to be designed which selection is typically received via the user interface 42.

For every pair of selected endpoint devices the network forming unit 44 furthermore obtains information about a corresponding process control or automation function for which communication between the two endpoint devices is to be implemented. This information may be pre-determined in that a graphical object representing a certain endpoint device may also be dedicated to a specific function. There may for instance exist several selectable objects representing servers, where each such object may be related to the implementation of a certain process control or automation function on a server.

As an alternative it is possible that the user may select a function that is to be implemented between two endpoint devices. The user may thus possibly also select a process control or automation function in which the endpoint devices are to communicate with each other.

A user may in this way select the end point devices that are to communicate with each other, the functions for which the communication is to take place and some communication requirements such as signals and communication protocols. It is in this respect also possible that some or all of the rest of the communication requirements may be selected, such as time and service requirements on the signals. Some or all of the communication requirements may also be automatically set by the network configuration device 35 once a function is selected by the user. One endpoint device in the pair typically performs processing, while the other provides data for or receives results of this processing. It should be realized that the fact that the other endpoint device provides data or receives results from processing does not preclude the possibility that it also performs some additional processing.

Figure 5:
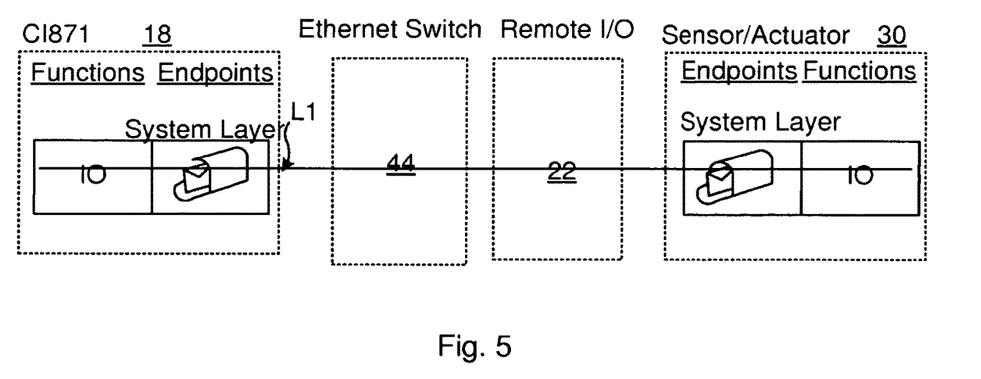
FIG. 5 shows a link between two communication endpoint devices being created by the user.

As an example, again with reference to FIG. 4, a user may select a process control function, such as Closed-loop control, and two endpoint devices, the process control computer 18 and the first wireless field device 30. Graphical objects representing the endpoint devices 18 and 30 may then be placed on a separate canvas by the network forming unit 44 and set to communicate with each other in the system model through the user interconnecting the objects with a line that forms a communication link L1, as seen in FIG. 5.

The network planning user may also select a physical location for the physical devices corresponding to the planned endpoint devices in the system model. The selection of physical location is thus a selection of a location for the physical end point devices in the premises.

Thereafter the network forming unit forms a system model comprising software representations of the process control endpoint devices and the network elements. Here it is possible and even likely that communication network elements are shared by more than one link.

The modelling performed by the network forming unit 44 may involve deriving a selection of functional nodes for performing automation or process control functions and a communication infrastructure layout, i.e. a layout of the communication network.

Once the user has made the above-mentioned selections, the network forming unit 44 of the network configuration device 35 determines a set of elements of the communication network that are to interconnect the endpoint devices of the communication link L1 in the system model. It thus determines which endpoint devices that are to be interconnected in the system model using a virtual communication network comprising virtual communication network elements. Thereby each link comprises a number of items including the selected endpoint devices and at least one communication network element. Furthermore as there are several endpoint devices it is also clear that at least one link will comprise a communication network element that is a communication network device. At least some of the links will thus comprise a communication network device.

The network forming unit 44 may thus with advantage be used for suggesting infrastructure that is to interconnect the various end point devices that make up the process control system. The communication requirements of the applications may in this case be used as rules for the suggestions.

For each such pair, the network forming unit 44 then forms an end-to end link between the endpoint devices based on the communication requirements, where the link comprises a number of items including the endpoint devices and at least one communication network element. How this may be done will be described shortly.

For every link that is created between two endpoint devices in respect of a process control or automation function, the network forming unit 44 of the network configuration device 35 creates a series of dependencies or settings indicating the endpoint devices, process control or automation functions, data communication requirements and communication network elements that are included in the link. The different items of a link are thus related to each other.

FIG. 5 schematically shows a suggestion for the example of a process control computer 18 and a first wireless field device 30 in the link L1. Therefore the network forming unit 44 of the network configuration device 35 may suggest the introduction of a virtual Ethernet switch 44. The first wireless field device 30, which needs to use the Wireless HART protocol, is in turn suggested to be connected to a virtual second wireless remote IO device 22 and the virtual second wireless remote IO device 20 is then suggested to be connected to the virtual Ethernet switch 44. It is here also possible that the network forming unit 44 suggests based on a rule based allocation, a calculation or a simulation how the process control computer 18, Ethernet switch 44 and second remote IO device 22 are to be interconnected, such as through cable, optical fibre etc.

As can be seen above, one of the selected endpoint devices was a wireless endpoint device needing to communicate wirelessly in the process control system 10. This means that of a pair of user selected endpoint devices, then at least one may be a wireless endpoint device like a wireless field device, while the other may be a stationary or fixed device or another wireless device. A wireless sensor/actuator may for instance need to communicate with a wired controller or a wireless controller.

This means that for the links that are formed in the above-described way, there may be a need for also suggesting a wireless communication network realization for enabling the wireless endpoint devices to communicate with the process control system. This may have to be carried out in a somewhat different way than the above-described general network forming.

It would further be of interest if the network forming unit 44 could provide suggestions and also configurations of such a wireless communication network for the process control system.

However, this is not so easy to do because in addition to conventional radio network requirements such as coverage, radio link border of wireless devices and number of channels per cell/access point, also the specific requirements of the process control system have to be considered.

Figure 6:
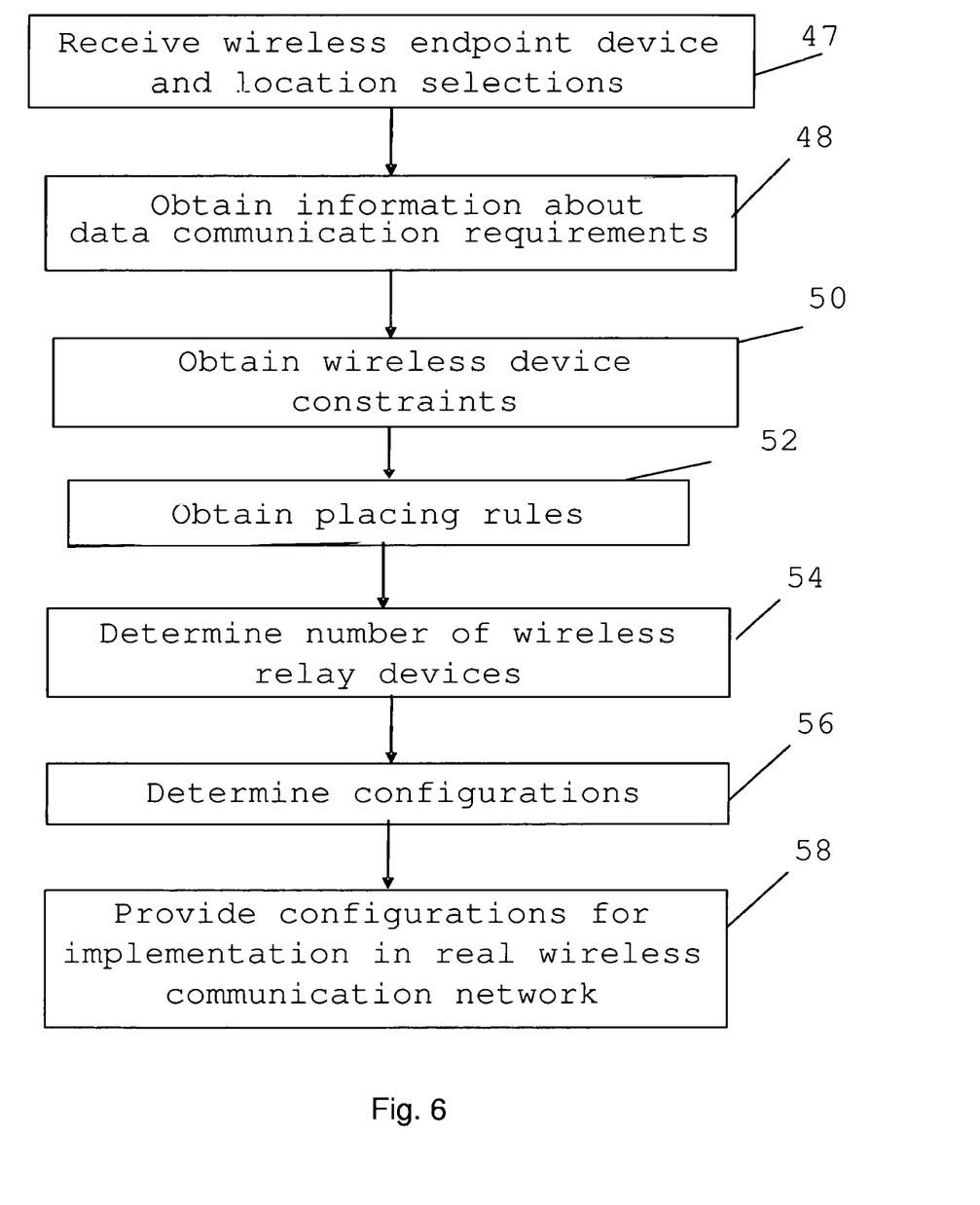
FIG. 6 shows a flow chart of a number of method steps being performed in a method of determining a wireless communication network realization for the real process control system, FIG. 7 schematically shows two wireless access points and two endpoint devices in a plant of the process control system.

A first embodiment directed towards addressing this will now be described with reference being made to FIG. 6, which shows a flow chart of method steps in a method for determining a wireless communication network realization in the plant where the process control system is provided. The word realization as used here means an implementation of a wireless communication network in a plant where a real process control system is provided.

As described earlier the user has made a number of endpoint device selections and some of these selections are selections of wireless endpoint devices. As was also described above a lot of further settings were made in relation to the wireless endpoint devices, such as the communication requirements like signals and the timing requirements of these signals.

Some of the selections would involve wireless field devices communicating with the process control computer 18. For these, the network configuring unit 44 would thus create links to the wired process control computer. However some links could also be between two wireless endpoint devices as can implicitly be understood from FIG. 4, where it can be seen that a controller may be a wireless controller. Furthermore, at least when it comes to the wireless endpoint devices, the network forming unit 44 also has to receive position selections from the user, i.e. selections of positions in the plant where the wireless endpoint devices are to be placed.

In order to suggest a wireless network, the network forming unit 44 thus receives a user selection of wireless endpoint devices and locations of these wireless endpoint devices in the plant, step 47, where these are typically received in the context of forming endpoint device pairs and links between such endpoint device pairs in relation to an automation or process control function. Thereby each wireless endpoint device is also at least one end point device in a pair of endpoint devices that are to communicate with each other in relation to an automation function of the process control system.

As can be seen in the example in FIG. 5 the control computer 18 and the first wireless field device 30 are one such endpoint device pair and these are associated with a function such as a process area closed-loop control and a signal such as a sensor reporting signal S1 or an actuator control signal S2, see FIG. 4.

After having received the user selection, the network forming unit 44 then obtains data about communication requirements of the wireless endpoint devices, step 48, which are the data communication requirements related to the automation function and comprise at least one signal sent between the pair of endpoint devices and a time within which it is supposed to reach its destination. In the example given above, the signal may be the signal S1 and the time within which it has to reach the process control computer 18 from the first wireless field device 30.

Such information is then gathered for all wireless endpoint devices. This means that for all user selected wireless endpoint devices, the network forming unit 44 fetches the corresponding link and obtains he corresponding communication requirements, which thus comprises information about the time at which a signal should travel between the endpoint devices of the pair. It is possible that in the same way the second signal S2 and the time with which it should reach the second wireless field device 32 from the process control computer 18 is also obtained. In some variations, each such time associated with a signal may be set as half the control cycle time. The information obtained in relation to a pair of endpoint devices may also comprise auxiliary information about the automation function, such as if the signal is to be redundant or if there is to be functional autonomy.

Thereafter the network forming unit 44 optionally obtains wireless relay device constraints, step 50. The wireless device constraints may comprise limitations of the number of hops a signal is allowed to make from or to an end point device in the wireless communication network. Another constraint may be a maximum allowed number of wireless endpoint devices in the wireless communication network.

It also obtains data about wireless relay device rules and/or placing rules, step 52. There may for instance be data about forbidden areas or forbidden zones, such as Explosion zones or inaccessible zones where battery powered wireless devices should not to be placed, because batteries are hard to replace there. The set of placing rules may thus comprise energy consumption and availability constraints. The energy consumption constraints may in this case be the energy consumption constraints of each wireless device and availability constraints may be the availability constraints of the exchanged signal. There may also be preferred locations where wireless devices should be placed, such as locations where there is access to the Backbone network and/or electric outlets.

Thereafter the network forming unit 44 determines a number of wireless relay devices related to the locations of the wireless endpoint devices for achieving a defined degree of radio coverage in the plant sufficient to satisfy the data communication requirements, step 54. In the embodiment described here it also applies the wireless device constraints and placing rules.

The defined degree of radio coverage may furthermore be a maximum radio coverage that is obtained for a minimum number of wireless nodes.

The determination of a number of wireless relay devices may depend on the endpoint device and endpoint device location selections and may comprise border data about these nodes such as the range of a wireless transmitter.

Based on these properties of the wireless endpoint devices and the communication requirements, the wireless relay devices are thus determined.

A wireless relay device may be a device that exclusively operates as a relay between endpoint devices. For this type of wireless relay device, the network forming unit 44 also determines location. This type of exclusively wireless relay device does thus not act as an endpoint device itself. It does thus not have any data for or receive any processing from a corresponding device, but only acts as a relay for aiding in the transfer of data and instructions between one or more endpoint device pairs. This type of wireless relay device is typically an access point, wireless gateway or wireless repeater, such as the first and second wireless IO devices 22 and 23 shown in FIG. 1. This type of wireless relay device may have a signal strength setting and also a setting of the number of channels it supports, which settings may be pre-determined or set by the user.

As an alternative a wireless relay device may be another endpoint device. This situation is shown in FIG. 1, where the second wireless field device 32, which is an endpoint device in its own right, acts as a relay for the data from a wireless endpoint device implemented through the third wireless field device 34. In this case the position of the second wireless field device has already been set by the user. Also the signal strength of the transmitter may be previously set by the user.

The wireless relay devices may be selected and often also placed at locations determined through calculating a distance from the corresponding endpoint device. The distance may be calculated from a coverage ratio of estimated signal parameters (signal strength, others) in at least one area comprising at least one intersection between a wireless signal from the at least one wireless relay device and a wireless signal from the endpoint device. This may be done through providing each wireless device enclosed in an area, which area has a contour that represents a minimum allowed signal strength. If for instance a wireless device has a certain transmitting power, then the contour represents the distances from the transmitter at which the signal strength has decreased by a certain degree. It is then possible that all the wireless devices, the wireless endpoint devices and exclusively wireless relay devices, has such an area with a contour.

In this case a defined degree of coverage may be obtained when, for every endpoint device pair, the contour of every wireless device in a path between two endpoint devices intersects the contour of a neighboring wireless device.

The distance or contours may furthermore be set to correspond to a 3 dB level, i.e. the distance at which the power from the transmitter of the node is reduced by 3 dB. This way of determining coverage may also be applied between any two wireless nodes. In one variation all wireless devices may use contours set to the same level, such as a 3 dB level. The minimum allowed signal strength may thus be the same for at least some wireless devices. However, it is also possible that two wireless devices have different contour levels. The minimum signal strength may thus differ between at least some wireless devices. A wireless endpoint device may for instance require a higher level such as 2 dB, while a gateway may have a lower level such as 4 dB. Any pair of nodes may thus have different signal strengths used for determining coverage.

It is in this case also possible that signal attenuation constraints are considered, such as obstacles formed by physical plant elements as a part of the determining of coverage. Examples of physical plant elements are building walls and ceilings. The area enclosing a wireless device may thereby be adjusted in order to accommodate signal attenuation caused by the physical plant elements.

The network forming unit 44 may thus calculate cross-cuts between all coverage areas of endpoint devices and suggested wireless relay devices. It may then use the resulting shapes to determine level of radio coverage of an area, interference regions (essentially, all such coverage-area-cuts are areas of identical interference); within the model of "3 dB boundaries", this is the exact number of interesting areas and for each interference region it calculates the expected radio channel or frequency band usage and potential conflicts; this can be input to co-existence planning and e.g. black-listing.

The number of wireless relay devices needed may also be calculated from the number of wireless endpoint devices required (sensors, actuators, wireless controllers) and from the calculated amounts and frequency, latency etc. of data communication traffic required by the automation functions. The network forming unit 44 may also point at coverage gaps, propose possible placements or even select a specific placement at a physical location for each wireless relay device that gives the best coverage or otherwise optimum wireless coverage within the plant. Rules or constraints (defined in part from a specification and/or one or more protocols or explicitly for a certain location) may be used to define how (e.g. where, in relation to other nodes) a node may be placed, how many nodes may be used e.g. functional nodes (e.g. sensors) repeaters, routers; and how many hops are allowed for e.g. high-medium-low priority traffic or other type of categorization; how energy consumption and availability, also through energy harvesting, needs to be considered; how much over-coverage is needed to support redundancy schemes or to enable simple network planning.

The placing may be such that the signal needs to reach the corresponding end-point in time. The network forming unit 44 may simulate the time it takes for the signal to be transferred between the endpoint devices of the links, given the proposed placement of endpoint devices, intermediate nodes and communication media. This may mean that a link may be disallowed from employing a repeater if the time to reach the destination would be too long, such as if the signal of the link travels via one or more hops. The wireless device constraints may thereby regulate how many hops a signal may be allowed to make in the process control network. The situation described above could therefore lead to suggesting an access point being connected to the backbone network instead of a wireless repeater because of the time limit.

Furthermore the selection of locations and wireless devices may also consider the control period T. This may be done through considering the time limit for a signal of one link or endpoint device pair together with the time limit for a corresponding signal of another link or endpoint device pair, where the latter signal may be an actuator signal and the former being a sensor reporting signal or sensor measurement and the latter signal being generated based on the former. These signals may be considered jointly in that the sum of these times perhaps together with processing time in the nodes would have to be less than or below the control period T. This means that the combined times of the signals to pass between two respective endpoint devices have to be inside the control period T. This also means that for the example given above the time of the signal S1 from the first wireless field device 30 via the wireless network and the wired network to the process control computer 18 plus the time of the signal S2 from the process control computer 18 to the second wireless field device 32 via the wired network and the wireless network, may be considered together in relation to the control period T. Thereby one of the wireless field devices 32 may be suggested to be closer to the backbone network than the other. The timing may thus differ between the signals as long as the combination is within the control period T.

It is also possible to apply redundancy in the determining of a number of wireless relay devices. If there is one or more redundancy setting, then an endpoint device may need to have two routes, which may mean that a wireless endpoint device may be set to communicate with two different wireless relay devices, such as with two different access points. The redundancy setting may be determined by a requirement of the wireless communication network and/or by a requirement of an automation function of the process control system. The redundancy setting may also be selected by the user. There may also be a setting of functional autonomy. This may mean that one wireless relay device, such as an access point, may be reserved for one endpoint device pair. No signals of other endpoint device pairs may be allowed to pass this wireless relay device. It is also possible that a second wireless relay device is added at a location, in case the traffic handling capacity of the first is not enough for the endpoint devices that are covered. Then wireless device constraints may also regulate how many endpoint devices that are allowed to be placed in the wireless communication network.

At the same time the placing rules may be observed, such as forbidden zones and preferred placement locations.

Once the user selections have been made and the suggested infrastructure accepted by the user, the communication network elements, end point devices, functions and signals made for an end-to-end link are stored in the system model with a reference to each other. They may with advantage be stored as software objects defining the end point devices, their automation functions and signals and communication network elements. The dependencies may be stored as pointers, where a pointer in one software object may point to another software object. The code defining these software objects may with advantage be provided in the memory 38 of the network configuration device 35. As an alternative it may be stored in the database 16. It should be realized that a pointer is merely one way in which a dependency may be provided. Each link is thus included in the system model through the items of it being related to each other.

Furthermore, as a part of the finalising of the system model, the network forming unit also determines configurations of the endpoint devices and network devices for communicating in the communication infrastructure. A configuring may involve configuration/parameterization of the functional nodes (sensors, actuators, controllers, etc.) and communication network nodes required by the process control functions communication. A configuration may comprise various communication model layer settings, such as protocol settings, Internet Protocol (IP) addresses and Virtual Local Area Network (VLAN) configurations for physical ports. This means that these configurations may also be made in respect of the wireless endpoint devices and the exclusive wireless relay devices of the wireless communication network.

After the user has accepted the system or made some changes, the network configuring device more particularly determines configurations for the wireless endpoint device as well as the wireless relay devices, step 56, which configurations may comprise configuring exclusive wireless relay devices and wireless endpoint devices to operate with wireless signal parameters optimized to the calculated coverage ratio. It may also comprise configuring settings of communication technology and output power levels, bandwidth allowed jitter and etc.

Here it should also be mentioned that it is possible that there are different versions that may exist of the system model, which versions may be possible to separate through different version numbers and/or creation dates.

Once a final system model has been decided, a corresponding real process control system may then be built using real or physical infrastructure elements corresponding to the software objects of the infrastructure elements defined in the finalised system model design.

As a part of this, the created configurations may be provided for implementation in the physical devices that are used as wireless endpoint devices and wireless relay devices of the real process control system, step 50.

For instance, once the system model of the communication network has been determined, it is then possible to export the configuration parameters for every object in the model (endpoint devices and network elements) and download the configurations for each of the respective objects into a real network built according to the system model. Thus a configuration is calculated for each wireless access point, wireless gateway, wireless repeater, wireless actuator and wireless sensor and so on and these configurations are downloaded into each of the (unique) components in the network. By taking the device parameters from the system model, there is a single point of reference or data entry. Thereby inconsistencies between device parameters and intended design can be found and resolved easily.

Furthermore the configurations may be provided in one or more storage media for transfer to the physical devices in a real process control system that correspond to the endpoint devices and/or communication network devices of the system model. A storage medium may be data carrier, such as a CD Rom disk or USB stick comprising one or more configuration files with configurations. It may also be configuration server used for download/upload of configurations to devices using technologies such as Simple Network Management Protocol) (SNMP) and Open Platform Communication Unified Architecture (OPC UA).

The configurations of the devices of the system model, both the endpoint devices and the exclusive wireless relay devices of the wireless communication network, may be provided on a storage medium and used for configuring the physical devices in the real process control system. It is possible that the settings used for the layers of the communication model in the virtual devices may be stored on such a storage medium and then used for configuring the physical devices in the process control system.

When the model has been created or whenever the model is in the process of being created, it is possible for the user to view the various system model items. The display is controlled by the visualizing unit 46. The visualizing unit 46 is able to visualize the links of the system model through displaying the items of the links in a view comprising any of: tables arranged side by side; a schematic circuit or a network topology diagram.

The user may for instance view the planned wireless network through the aid of the visualizing unit 46. It may more particularly display the various endpoint devices, the wireless network nodes and the radio coverage of the various nodes. It may furthermore display the impact on the radio coverage of signal attenuation caused by physical plant elements. How a visualization may look can be seen in FIG. 7, where a first access point in the form of the second remote IO device 22 has been placed at the wall of a first building B1 in which building the first wireless field devices 30 is placed, while a second access point, in the form of the third remote IO device 23 has been placed outdoors together with the second wireless field device 32. As can be seen the second remote IO device 22 is placed close to the wall of the first building B1, where there is easy access to the backbone network and electrical outlets. It can also be seen that the range of the second remote IO device 22 is changed because of the wall of the building B1. The third remote IO device 23 is on the other hand placed outdoors. However, here there is a second building B2, which forms an obstacle that influences the range of the third remote IO device 23. As can be seen, in particular the coverage and interference regions of the wireless networks may be visualized to the user.

Figure 7:
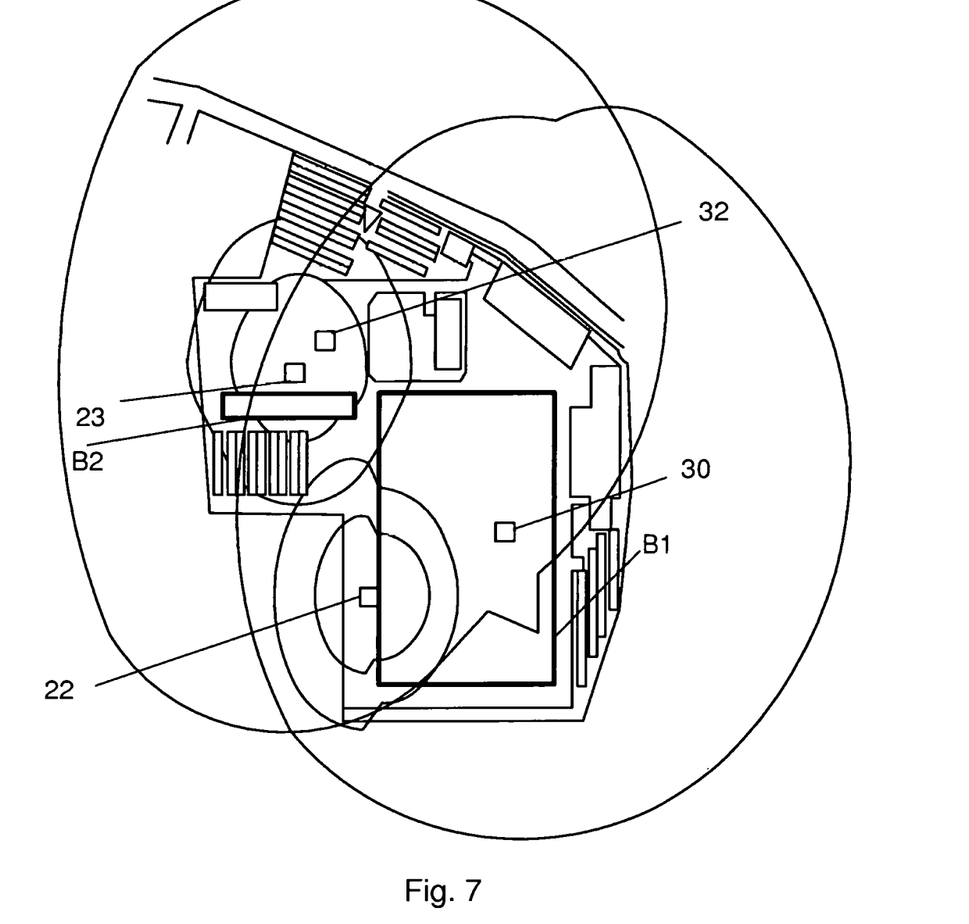

The visualizing unit 46 may more particularly show the areas of coverage as well as just the areas with insufficient coverage to the user. Given that there is a finite and complete (within the boundaries of the 3 dB model) number of such areas, the visualizing unit 46 can also offer each one in turn to the user for inspection in order not to overwhelm him or her. It is also possible to just simply show the most critical interference areas. This is possible because both the drawings and the shapes (coverage areas, intersections, cuts, etc.) may be treated as engineering data, even though some of these data are generated from technology parameters like signal strengths or antenna properties. Thus the visualizing unit 46 can display to the user in a view of the plant any of: the wireless end point devices, the wireless nodes, the radio coverage of the wireless nodes, signal attenuation constraints caused by physical plant elements.

The invention has a number of advantages. Users can work with the network forming unit 44 without having wireless expertise and with little effort simply by treating it like a drawing tool, but actually getting design proposals and technical validation feedback based on the visual input data.

It can be seen that the adding of obstruction areas in the form of simply drawn shapes influence the coverage areas.

Users can even just follow elements of the background drawing to add the shapes. Again, no wireless expertise is needed, users can immediately understand the impact of their input, and immediately benefit from any detail they incrementally add.

In the same manner, we can give other roles to such area shapes, e.g. EX zones, no-cabling zones, etc. which the tool can use for other calculations. E.g. to ensure we only use EX-certified (wireless) devices within an EX zone.

The visualizing unit 46 also takes into account environmental properties such as the average radio obstruction of a location to attenuate signal strength. In addition, dedicated obstruction areas can be supplied with a default or adapted attenuation level. Also these areas can be supplied by simply drawing onto a graphical representation of a location, or they can be used from a previous import or engineering step. Furthermore it is ensured that automation functions can be carried out in the proposed structure. Additionally also the device configurations are provided, which simplifies the configuration of the actual system, that is, the real process control system.

By making all these data (incl. the generated ones) subject to versioning, it is also possible to link some network problems also to changes in network design or parameterization that were made during the life-time of the wireless system.

Figure 8:
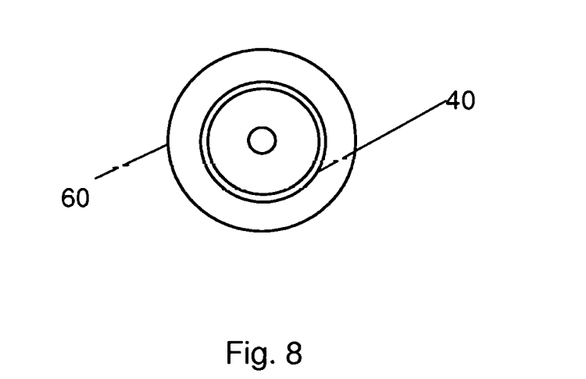
FIG. 8 shows a data carrier with computer program code, in the form of a CD-ROM disc, for performing the steps of the method.

The network configuration device may, as was previously mentioned, be provided in the form of one or more processors together with computer program memory including computer program code for performing its functions. This computer program code may also be provided on one or more data carriers which perform the functionality of the network configuration device when the program code is being loaded into a computer forming the network configuration device. One such data carrier 60 with computer program code 40, in the form of a CD ROM disc, is schematically shown in FIG. 8. Such a computer program may as an alternative be provided on another server and downloaded therefrom into the network configuration device.

The invention claimed is:

1. A network configuration device for determining a wireless communication network realization in a plant where a process control system is provided, the device comprising:
   a network forming unit operative to:
      receive a user selection of wireless endpoint devices and locations of these wireless endpoint devices in the plant, where each wireless endpoint device is provided as at least one of a pair of endpoint devices that are to communicate with each other in relation to an automation function of the process control system, where one endpoint device in a pair performs processing and the other provides data for or receives results of said processing and each wireless device is enclosed in an area, the contour of which represents a minimum allowed signal strength,
      obtain data communication requirements of the wireless endpoint devices, which data communication requirements are related to the automation functions and include at least one signal sent between a pair of endpoint devices and the time within which it has to reach its destination in order to be able to be used in the corresponding automation function,
      determine a number of wireless relay devices related to the locations of wireless endpoint devices in the plant achieving a defined degree of radio coverage sufficient to satisfy the data communication requirements, and
      make, for every endpoint device pair, the contour of every wireless device in a path between two endpoint devices intersect the contour of a neighboring wireless device for obtaining the defined degree of radio coverage.

2. The network configuration device according to claim 1, wherein the at least one wireless relay device includes a wireless end point device.

3. The network configuration device according to claim 2, wherein the at least one wireless relay device includes a wireless relay device exclusively operating as a relay between endpoint devices and the network forming unit is further operative to determine the position of the exclusive wireless relay device.

4. The network configuration device according to claim 2, wherein the network forming unit is further operative to determine configurations of the endpoint devices and wireless relay devices for communicating in the wireless communication network and provide at least some of the configurations for implementation in the devices of the real process control system that implement endpoint devices and wireless relay devices.

5. The network forming configuration device according to claim 2, wherein the communication requirements includes quality of service requirements such as round-trip time, bandwidth, jitter and/or an amount of data to be transmitted in at least one signal.

6. The network configuration device according to claim 1, wherein the at least one wireless relay device includes a wireless relay device exclusively operating as a relay between endpoint devices and the network forming unit is further operative to determine the position of the exclusive wireless relay device.

7. The network configuration device according to claim 1, wherein the network forming unit is further operative to determine configurations of the endpoint devices and wireless relay devices for communicating in the wireless communication network and provide at least some of the configurations for implementation in the devices of the real process control system that implement endpoint devices and wireless relay devices.

8. The network forming configuration device according to claim 1, wherein the communication requirements includes quality of service requirements such as round-trip time, bandwidth, jitter and/or an amount of data to be transmitted in at least one signal.

9. The network configuration device according to claim 1, wherein there are at least two endpoint device pairs, where a signal of one pair is a sensor measurement and the signal of the other pair is an actuator signal generated based on the sensor measurement, where the combined times of the signals to pass between the endpoint devices are required to be inside a control period T of the process control system.

10. The network configuration device according to claim 1, wherein the network forming unit is operative to adjust the radio coverage area of a wireless device to accommodate signal attenuation caused by physical plant elements.

11. The network configuration device according to claim 1, wherein the network forming unit is further operative to apply redundancy in the determining of wireless relay devices for at least one pair of endpoint devices.

12. The network configuration device according to claim 1, wherein the network forming unit is further operative to apply a set of wireless device constraints when determining wireless relay devices.

13. The network configuration device according claim 12, wherein the set of wireless device constraints regulate how many hops a signal from one end point device may make in the wireless communication network.

14. The network configuration device according to claim 13, wherein the set of wireless device constraints regulate the number of wireless endpoint devices that are allowed in the wireless communication network.

15. The network configuration device according to claim 12, wherein the set of wireless device constraints regulate the number of wireless endpoint devices that are allowed in the wireless communication network.

16. The network configuration device according to claim 15, wherein the set of placing rules include energy consumption for each device and availability constraints of the exchanged signal.

17. The network configuration device according to claim 1, wherein the network forming unit is further operative to apply a set of placing rules when determining a number of wireless relay devices in the process control system plant.

18. A method for determining a wireless communication network realization in a plant where a process control system is provided, the method being performed by a network configuration device and including:
receiving a user selection of wireless end point devices and locations of these wireless endpoint devices in the plant, where each wireless endpoint device is provided as at least one of a pair of endpoint devices that are to communicate with each other in relation to an automation function of the process control system, where one endpoint device in a pair performs processing and the other provides data for or receives results of said processing and each wireless device is enclosed in an area, the contour of which represents a minimum allowed signal strength,
obtaining data communication requirements of the wireless endpoint devices, which data communication requirements are related to the automation functions and include at least one signal sent between a pair of endpoint devices and a time within which it has to reach its destination in order to be able to be used in the corresponding automation function,
determining a number of wireless relay devices related to the locations of the wireless endpoint devices in the plant achieving a defined degree of radio coverage sufficient to satisfy the data communication requirements, and
making, for every endpoint device pair, the contour of every wireless device in a path between two endpoint devices intersect the contour of a neighboring wireless device for obtaining the defined degree of radio coverage.

19. A computer program product for determining a wireless communication network realization in a plant where a process control system is provided, said computer program product being provided on a non-transitory storage medium including computer program code operative to cause a network configuration device, when said computer program code is loaded into said network configuration device, to
receive a user selection of wireless end point devices and locations of these wireless endpoint devices in the plant, where each wireless endpoint device is provided as at least one of a pair of endpoint devices that are to communicate with each other in relation to an automation function of the process control system, where one endpoint device in a pair performs processing and the other provides data for or receives results of said processing and each wireless device is enclosed in an area, the contour of which represents a minimum allowed signal strength,
obtain data communication requirements of the wireless endpoint devices, which data communication requirements are related to the automation functions and include at least one signal sent between a pair of endpoint devices and the time within which it has to reach its destination in order to be able to be used in the corresponding automation function,
determine a number of wireless relay devices related to the locations of wireless endpoint devices in the plant achieving a defined degree of radio coverage sufficient to satisfy the data communication requirements, and
make, for every endpoint device pair, the contour of every wireless device in a path between two endpoint devices intersect the contour of a neighboring wireless device for obtaining the defined degree of radio coverage.

* * * * *